April 3, 1951 G. B. COOK 2,547,746
EXPANSION JOINT SEAL
Filed Dec. 6, 1947 2 Sheets-Sheet 1

George B. Cook Inventor
By W. V. Hellman Attorney

April 3, 1951 G. B. COOK 2,547,746
EXPANSION JOINT SEAL
Filed Dec. 6, 1947 2 Sheets-Sheet 2
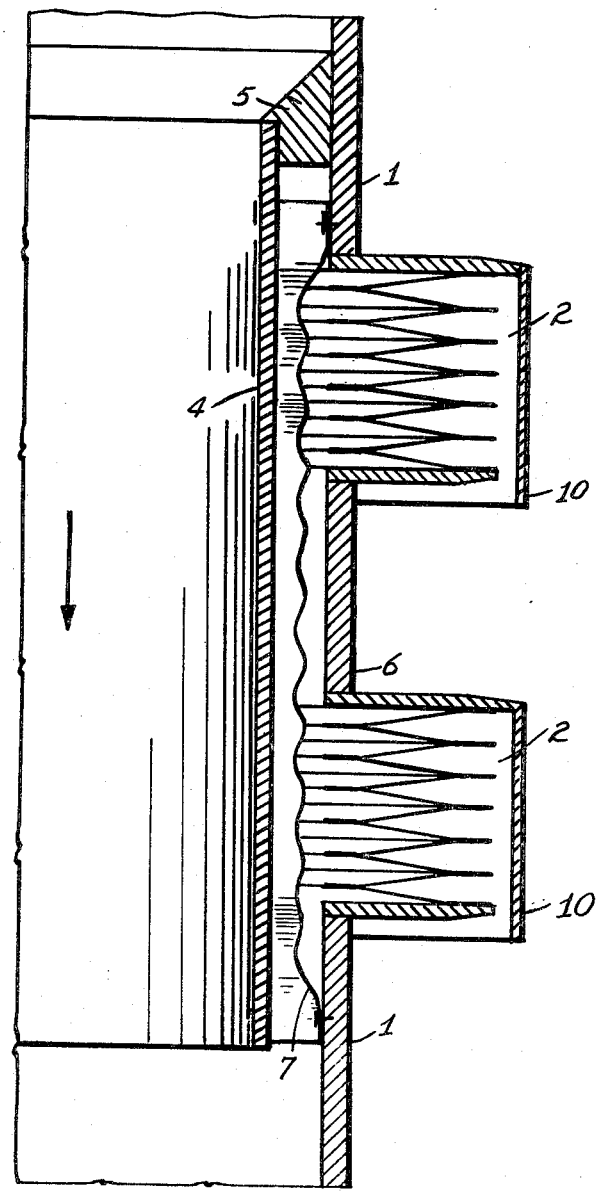
FIG.-II
George B. Cook Inventor
By W. O. J Heilman Attorney Patented Apr. 3, 1951

2,547,746

UNITED STATES PATENT OFFICE 2,547,746

EXPANSION JOINT SEAL

George B. Cook, Summit, N. J., assignor to Standard Oil Development Company, a corporation of Delaware Application December 6, 1947, Serial No. 790,057

5 Claims. (Cl. 285—90)

This invention relates to an improved seal for an expansion joint employed in fluidized processes. In particular the invention comprises positioning of a flexible fabric over the expansion joint applied in a process utilizing solid particles whereby plugging of the expansion joint is prevented.

At the present time fluidized processes are becoming of increasing importance in the chemical industry, generally, and the petroleum refining industry particularly. In such a process fine solids in the form of small particles, or powder, are fluidized by the flow of gases. Handling of such fluidized particles is accompanied with various problems. The present invention deals with the problem caused by the plugging of expansion joints by the solid particles, causing such joints to be rendered inoperative.

Expansion joints are frequently used in fluidized processes in order to compensate for the large temperature differentials often encountered. For example, in a fluid catalyst cracking process, apparatus may vary in temperature between room temperature and as high as 1000° F., consequently, ducts subjected to this temperature differential require the use of expansion joints. The expansion joints employed generally consist of metallic bellows placed in the line. Difficulties have been encountered due to the accumulation of solid particles in the bellows of the expansion joint. The finely pulverized solids have a tendency to pack into the bellows, and in some cases to harden, with the result that the life of the expansion joint is considerably shortened, or the joint is actually rendered inoperative. Attempts have been made to remedy this condition by the insertion of sleeves in the expansion joint. This expedient has not proven successful, however, as any sleeve employed still leaves sufficient opening for the solid particles to reach and plug the bellows.

In accordance with the present invention, a flexible fabric is employed to substantially seal the bellows from the fluidized solid particles, thus overcoming the aforementioned problems.

My invention will be more fully understood from the following detailed description in connection with the accompanying drawings in which:

Fig. 1 represents an embodiment of my invention showing in cross section a rigid protective sleeve together with a flexible fabric, and in which:

Fig. 2 represents another embodiment of my invention showing in cross section a somewhat different arrangement of the flexible fabric seal to protect the expansion joint.

Figure 1:
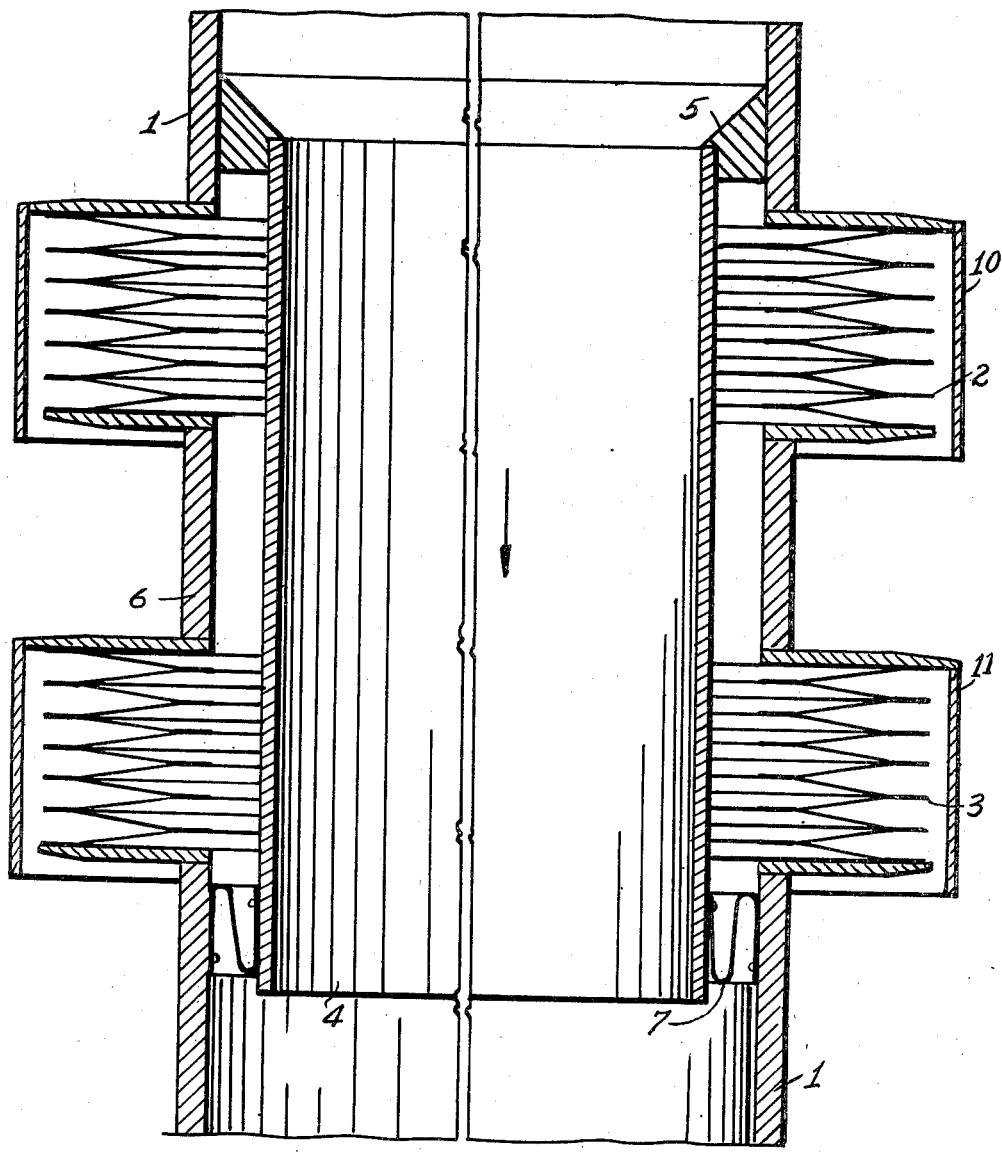

Referring now to Fig. 1, I represents a duct in which is positioned an expansion joint comprising the bellows 2 and 3 and an expansion joint shell, or rigid tubular spacer element 6. The bellows 2 and 3 may be made of any desired material, but it is preferred that they be fabricated of stainless steel; for example 18–8 stainless steel. As shown by the drawing, the bellows may be welded or otherwise affixed to the duct I so as to completely seal the duct while permitting longitudinal expansion due to temperature differentials. The shields 10 and 11 may be employed to externally protect the bellows. On the inside of the duct, a fixed sleeve 4 is positioned to protect the bellows from the action of the fluidized particles flowing through the duct in the direction indicated by an arrow on the drawings. The rigid sleeve 4 may be of the same composition as the duct I, and is fixed to the duct by means of the spacer 5 which is welded both to the fixed sleeve and to the duct. It is apparent that it is preferred to fix the sleeve to the duct by welding, as described, upstream from the bellows. It will be noted that a fixed sleeve as illustrated is effective to substantially seal the bellows against impingement of the fluidized particles, but is not effective to prevent the entrance of fluidized particles beneath the sleeve and into the bellows. Consequently, in accordance with my invention I position a flexible fabric seal 7 between the duct and the fixed sleeve at the opposite end of the sleeve to that sealed to the duct by the welded joint described. The fabric extends circumferentially around the entire sleeve and the duct so as to substantially seal the expansion joint against the entrance of fluidized particles. The fabric may comprise any suitable flexible filter medium, as it is desirable that the fabric be capable of permitting gas or air to pass, but will prevent the passage of fine solids. The fabric may for example be made of asbestos, glass, steel or fine mesh wire. Any suitable means of connecting the fabric to the fixed sleeve and to the duct may be employed. If the fabric is of metal it may be welded, or soldered directly to the surface. In the case of known metallic fabrics the preferred manner of connecting the fabric is by spot welding thin metallic retaining strips to the duct wall and to the sleeve. It is desirable to position the fabric allowing sufficient slack so as to permit expansion and contraction of the joint without rupturing the fabric.

Referring to the embodiment of Fig. 2, substantially the same type of joint is illustrated.

Like portions are identified by like numerals. In the embodiment of Fig. 2, the flexible fabric seal 7 is connected to the two ends of the duct in which the expansion joint is positioned in such a way as to again completely seal the expansion joint from the action of the fluidized particles. As the flexible fabric, in the position illustrated in Fig. 2, is substantially protected from the fluidized particles by means of the fixed sleeve 4, no difficulty is encountered due to the erosion of the fabric by the fluidized solids.

As described my invention comprises the use of a flexible fabric seal in conjunction with a fixed rigid sleeve to completely seal the bellows of an expansion joint against erosion or plugging caused by solid particles.

Having now described this invention, what is claimed is:

1. An expansion joint connection between opposed end portions of adjoining sections of a conduit system for handling fluidized solid materials, comprising a tubular sleeve member secured at one end interiorly of one conduit section end portion in fluid-tight relation thereto, and extending into the other conduit section end portion in concentric, annularly spaced relation interiorly thereof, an annular bellows member secured at one end to each of said conduit section end portions, concentric therewith and with said sleeve, the other ends of said members extending into spaced, opposed relation to each other, a rigid tubular spacer element secured between said opposed members in fluid-tight relation to each and in radially spaced relation to said sleeve, and an annular seal between the interior of said bellows members and spacer element therefor, and the interior of the conduit sections, said seal being permeable to fluids but not to solid particles handled in the system.

2. An expansion joint connection according to claim 1, wherein the seal between the interior of said connection and the conduit system is a flexible fabric material.

3. An expansion joint connection according to claim 2, in which the flexible fabric material is a flexible metallic fabric.

4. An expansion joint connection according to claim 1, wherein the seal between the interior of said connection and the conduit system is a tube of a flexible fabric material secured at each end to one of the opposed end portions of the adjoining sections in the conduit system between said sleeve member and the annular bellows member and spacer element, said tube being of substantially greater length than the normal distance between said opposed end portions of the adjoining conduit sections.

5. An expansion joint connection according to claim 1, wherein the annular seal is a tubular member of a length substantially greater than the width of the annular space between said sleeve and the conduit section end portion into which it is extended in annularly spaced relation, said tube secured at one end to the interior of the conduit section wall and at the other end to the exterior of said sleeve, the excess of material in said tubular member being freely disposed in the annular space between said sleeve and the interior of said conduit section wall.

GEORGE B. COOK.

REFERENCES CITED

The following references are of record in the file of this patent:

UNITED STATES PATENTS

| Number | Name | Date |
| --- | --- | --- |
| 1,923,124 | Stanley | Aug. 22, 1933 |
| 2,207,146 | Fentress | July 9, 1940 |